US011878447B2

(12) United States Patent
Pirahanchi et al.

(10) Patent No.: US 11,878,447 B2
(45) Date of Patent: Jan. 23, 2024

(54) SYSTEM AND METHOD FOR MULTI-MATERIAL MOLDING

(71) Applicant: Arris Composites Inc., Berkeley, CA (US)

(72) Inventors: Sam Pirahanchi, Novato, CA (US); Ethan Escowitz, Berkeley, CA (US); Erick Davidson, Piedmont, CA (US)

(73) Assignee: ARRIS COMPOSITES INC., Berkeley, CA (US)

( * ) Notice: Subject to any disclaimer, the term of this patent is extended or adjusted under 35 U.S.C. 154(b) by 88 days.

(21) Appl. No.: 17/532,459

(22) Filed: Nov. 22, 2021

(65) Prior Publication Data

US 2022/0161464 A1 May 26, 2022

Related U.S. Application Data

(60) Provisional application No. 63/116,550, filed on Nov. 20, 2020.

(51) Int. Cl.

| | |
|---|---|
| ***B29C 43/14*** | (2006.01) |
| ***B29C 43/36*** | (2006.01) |
| ***B29C 43/52*** | (2006.01) |
| ***B29C 43/34*** | (2006.01) |

(52) U.S. Cl.

CPC ............ *B29C 43/146* (2013.01); *B29C 43/34* (2013.01); *B29C 43/36* (2013.01); *B29C 43/52* (2013.01); *B29C 2043/3444* (2013.01)

(58) Field of Classification Search

CPC ..... B29C 43/146; B29C 43/203; B29C 43/34; B29C 43/36; B29C 43/361; B29C 43/52; B29C 45/02; B29C 45/1635; B29C 2045/025; B29C 2043/3444; B29C 43/265

See application file for complete search history.

(56) References Cited

U.S. PATENT DOCUMENTS

| | | | | |
|---|---|---|---|---|
| 5,198,174 | A | 3/1993 | Nakagawa et al. | |
| 5,753,164 | A * | 5/1998 | Ritchie | B29C 45/2669 264/108 |
| 6,630,085 | B1 * | 10/2003 | Bielich | B29C 45/16 264/328.15 |
| 2007/0278714 | A1 | 12/2007 | Johnson et al. | |

(Continued)

FOREIGN PATENT DOCUMENTS

JP 2000-226021 A 8/2000

OTHER PUBLICATIONS

Authorized Officer: Horubala, Tomasz, International Search Report and Written Opinion issued in PCT application No. PCT/US2021/060372, dated Mar. 28, 2022, 13 pp.

*Primary Examiner* — Emmanuel S Luk
*Assistant Examiner* — Victoria Bartlett
(74) *Attorney, Agent, or Firm* — Wayne S. Breyer; Kaplan Breyer Schwarz, LLP

(57) ABSTRACT

A multi-material molding apparatus and method includes a single mold having, within a mold cavity, one or more movable partitions that segregate at least first and second molding materials. The first molding material is processed to form a first molded portion of the multi-material part. The second molding material is then flowed, through the movable partition, into contact with the first molded portion. That second molding material is then solidified to form a second molded portion of the multi-material part.

11 Claims, 10 Drawing Sheets

(56) References Cited

U.S. PATENT DOCUMENTS

| | | | | |
|---|---|---|---|---|
| 2014/0077406 | A1* | 3/2014 | Okamoto | B29C 44/086<br>264/50 |
| 2014/0314901 | A1* | 10/2014 | Takaoka | B29C 45/1635<br>425/577 |
| 2021/0046672 | A1* | 2/2021 | Yoshinaga | B29C 43/006 |

* cited by examiner 100
102
104
106
107A
107B
108
110
112
114
115
116
117
118
119
121

200
202
104
106
108
110
112
114
115
116A
117
118
119
121
220

300
102
104
110
112
114
115
116
117
118
119
121
306
309
322

500
102
104
506
510
112
114
115
116
117
118
119
521

600
102
104
606
610
610A
610B
610C
612A
612B
614
116
118
122

102
606
610A
117

117
119
612A
612B
615
610B
610C 117
119
123
612B 102
625
610

900
930
931
902
932
906
934
104
910
115
116
118
114
112
936
117
119
121

902
117
1034

921
910
102
117
119

1000
906
102
104
116
910
118
114
936
112
1034

117
119
114
1034

SYSTEM AND METHOD FOR MULTI-MATERIAL MOLDING

STATEMENT OF RELATED CASES

This specification claims priority of U.S. Pat. App. Ser. No. 63/116,550 filed Nov. 20, 2020, and incorporated by reference herein.

FIELD OF THE INVENTION

The present invention relates to the manufacture of fiber-composite parts.

BACKGROUND

Multi-material molding involves molding a part from two or more different materials. This technique is usually practiced via injection molding technology. Advantages of multi-material injection molding relative to conventional injection molding, or other molding techniques, include an ability to mold a part: (a) in which elastic modulus varies from region-to-region, (b) consisting of different materials, such as rubber and plastic, and (c) having multiple colors. Thus, multi-material molding can provide parts with improved cosmetics as well as improved part utility and performance.

There are a variety of multi-material injection methods, chief of which include: over-molding, mufti-shot molding, and co-molding. In overmolding and multi-shot molding, a first portion of a part is molded in a first cycle, and a second of the part is molded in a second cycle. The mold cavity is different for each of the molding cycles.

In overmolding, a first material, often referred to as a "substrate," is covered by one or more other "overmold" materials. The substrate can be any component: a metal component, a molded plastic component, or even an existing product, such as electrical connectors, etc. The overmold material, which is typically a plastic or rubber, is often combined with additives (e.g., colorants, foaming agents, fillers, etc.) as required, and then heated to its melting point. After it is flowable, the overmold material is injected into the mold cavity in which the substrate resides and is molded onto/around it. Typical applications include a rigid plastic over rigid plastic (such as to provide a different color or texture), rubber over rigid plastic or metal (such as to provide a soft-grip area), and plastic over metal.

In multi-shot molding, a first plastic resin is injected into a mold in order to make a first portion of a part (analogous to the "substrate" of the overmolding process). A second compatible material is then injected into the mold (analogous to the "overmold" material). At least a portion of the mold is usually replaced to accommodate a change in the intended structure of final part before injecting the second material. The two plastic resins form a molecular bond, or mechanical locks (i.e., akin to woodworking-type joints) and the multi-resin molded part is then cooled and ejected. The interlayer bonds formed during multi-shot molding are typically stronger than when materials are applied to a previously cooled part, such as in over-molding.

In a variant of multi-shot molding—multi-shot rotary molding—a second material is injected to the mold at some point in the cycle rather than being present from the start of the process, as in co-molding. The mold is typically rotated, shuttled or swiveled to bring the cavity into a fill position for each material. There are a variety of designs for rotary two-shot molds, including: rotary platen two-shot mold, core toggle two-shot mold, seesaw two-shot mold, index plate two-shot mold, cavity sliding structure.

In co-molding, two or more viscous polymers are simultaneously molded, as opposed to adding a second material as an additional layer to a first material.

If a part can be manufactured via a multi-material molding method, it is typically desirable to do so. Relative to creating such a part via traditional injection molding, multi-material injection molding techniques typical result in a higher-quality product at lower cost, mostly due to a substantial reduction in assembly operations and reduced cycle times.

There are, however, a number of challenges to implementing multi-material injection-molding processes. With respect to two-shot rotary molding and overmolding, the mold/system design can be complex, requiring a secondary mold or mold core/cavity. There can be issues with production consistency, the operation of process is relatively complex, and such systems tend to require more maintenance than, for example, a standard injection-molding process. The equipment and space requirements to implement these processes can be prohibitive (the equipment necessary for feeding multiple different resins to the molds, etc.). The precision and repeatability of positional/border control between the shots of material can be difficult to control, which can ultimately affect the cosmetics and even the functionality of a part being produced. This is particularly true for co-molding operations.

SUMMARY

The present invention provides a multi-material molding apparatus and method that avoids some of the drawbacks and costs of the prior art. In accordance with the illustrative embodiment, a single mold having one or more movable partitions enables a multi-material part to be molded in a single mold tool, and without the use a complex multi-material injection system. In the illustrative embodiments, the molding proceeds via compression molding protocols. However, the techniques described herein can be applied by one skilled in the art to injection molding, as well.

In an illustrative embodiment, the compression molding tool includes a top block having a male mold feature, and a bottom block in which a mold cavity is defined. The mold cavity has an opening for receiving the male mold feature during compression molding. A partition is disposed in the mold cavity and is movable therein, typically along the same axis as the top block.

The molding tool receives a least two molding materials for molding the multi-material part. The two materials may be composite materials (fiber and polymer resin) and/or neat polymer resins (no fiber). Thus, the at least two molding materials may be:

- two different neat polymer resins; or
- one neat polymer resin and one composite, wherein the resin is the same; or
- one neat polymer resin and one composite, wherein the resins are different; or
- two different composites wherein the resins are the same and the fibers differ; or
- two different composites wherein the resins are different and the fibers are the same; or
- two different composites wherein both the resins and the fibers are different.

For use in this description and the appended claims, the term "molding material" means neat polymer resin and/or composite material.

Furthermore, the two (or more) materials may have the same or different form factors, individually selected from the following, among any others: pellets, tow-preg, composite tape, etc.

Additionally, and subject to a caveat mentioned below, the molding materials may be in the form of a "preform" or a "preform charge." A "preform" is a segment of plural, unidirectionally aligned fibers. The segment is cut to a specific length, and, in many cases, will be shaped (e.g., bent, twisted, etc.) to a specific form, as appropriate for a specific part being molded. Preforms are usually sourced from towpreg (i.e., the tow-preg is sectioned to a desired length), but can also be from another source of plural unidirectionally aligned fibers (e.g., from a resin impregnation process, etc.). The cross section of the preform, and the fiber bundle from which it is sourced typically has an aspect ratio (width-to-thickness) of between about 0.25 to about 6. Nearly all fibers in a given preform have the same length (i.e., the length of the preform) and, as previously noted, are unidirectionally aligned. Use of the term "preform" explicitly excludes any size of shaped pieces of: (i) tape (typically having an aspect ratio—cross section, as above—of between about 10 to about 30), (ii) sheets of fiber, and (iii) laminates.

A preform charge is an assemblage of preforms (as defined above) that are at least loosely bound together ("tacked") so as to maintain their position relative to one another. As compared to a final part, in which fibers/resin are fully consolidated, in a preform charge, the preforms are only partially consolidated (lacking sufficient pressure and possibly even sufficient temperature for full consolidation). By way of example, whereas applicant's compression-molding processes are typically conducted at about 1000 to 3000 psi (which will typically be the final destination of a preform-charge), the downward pressure applied to the preforms to create a preform charge is typically in the range of about 10 psi to about 100 psi. Thus, voids remain in a preform charge, and, as such, the preform charge cannot be used as a finished part.

The definition of "molding material" as neat polymer resin and/or composite materials, further references any of the form factors listed above; that is, pellets, tow-preg, composite tape, preform, preform charge, etc.

Within the mold cavity, the partition segregates a first molding material from a second molding material. In accordance with the present teachings, the molding materials are processed in sequence. The first molding material forms a first molded portion of the multi-material part. And then the second molding material is flowed into contact with the first molded portion and solidified to form a second molded portion of a multi-material part.

In accordance with the present teachings, the flow of the second material is facilitated by an opening in the partition. In some embodiments, the opening contains a flow-control mechanism, such as a valve; in some other embodiments, no valve is present in the opening. In some embodiments, flow is facilitated by actuating the partition into movement. For example, if the second molding material is disposed in the bottom of the mold cavity, and the partition is disposed above it, continued downward movement of the partition pressurizes the liquefied second molding material, forcing it through the opening in the partition. In some embodiments, a plunger, which is disposed below the mold cavity and is in fluidic communication therewith, pressurizes the liquefied molding material, forcing it to flow through the opening in the partition. In some embodiments, at least one of the molding materials is introduced through a sprue, and movement of the partition creates a cavity into which the molding material flows from the sprue. Additional embodiments are disclosed in the appended drawings and in the Detailed Description section of this specification.

With respect to the "caveat" mentioned above, to the extent that the molding materials are in the form of preforms or a preform charge, they cannot be flowed through the partition. As such, to the extent a molding material is the form of a preform or preform charge, it must be processed at the location in which it is initially sited in the mold cavity.

It is notable that the partitions included in embodiments of the invention are distinct from "slides," as are used in conventional molding processes. Such slides are often used to create "undercut" features in molded parts. If an attempt were made to form an undercut in a conventional two-part mold, such as via a conventional male mold half having an appropriately shaped region, that mold half could not be separated from the female mold half once molding was complete without destroying the undercut feature. To address this problem, "slide" molding was developed. Slide molding uses additional members—slides—that slide in and out of an assembled mold from the sides to produce undercut features, etc., in parts. This enables the mold to be opened after the part is formed without destroying the undercut feature. Such slides are quite different in structure and operation than the partitions used in conjunction with the present invention for creating multi-material parts.

Unlike prior-art multi-shot molding techniques, embodiments of the invention provide:

- A low-cost, simple system design;
- Reduced maintenance issues;
- A single molding tool, with no need for additional cores, cavities, or secondary molds;
- No limitations of the number of different materials that can be molded, subject to materials compatibility;
- Unique processing conditions can be readily applied to each molding material; and
- No complex multi-material resin injection system is required, so the real-estate requirement for each additional over-molding shot is no bigger than the overmolding cavity itself.

In some embodiments, the present invention provides molding tool having a single mold cavity that receives a first molding material and a second molding material to form a multi-material part, wherein the molding tool comprises a top block, the top block having a male mold feature; a bottom block; a mold cavity defined in the bottom block, the mold cavity having an opening that receives the male mold feature during molding; and a first partition, the first partition disposed in the mold cavity and movable therein, wherein the partition is physically adapted to (a) segregate the first molding material from the second molding material during molding of the first molding material to form a first molded portion of the multi-material part, and (b) enable flow of the second molding material to the first molded portion during molding of the second molding material, thereby forming a second molded portion of the multi-material part, the first molded portion and the second molded portion sharing an interface.

In some embodiments, the present invention provides a method for molding a multi-material part, wherein the method comprises segregating via a partition, a first molding material from a second molding material in a mold cavity; forming a first molded portion of the multi-material part from the first molding material; flowing the second molding material through the partition to the first molded portion; and forming a second molded portion of the multi-material part from the second molding material, the first molded portion and the second molded portion sharing a common interface.

Summarizing, a molding tool, as depicted and described, comprises: (i) a mold cavity, and (ii) a movable partition disposed in the mold cavity. Embodiments of the molding tool may further comprise at least one of the following features, in any (non-conflicting) combination, among other features disclosed herein:

- The partition includes an opening through which molding material can flow.
- A flow-control mechanism is disposed in the opening in the partition.
- There may be plural partitions in the mold cavity, either in a stacked orientation or side-by-side.
- The mold cavity has a stepped profile.
- The partition is sized to fit snuggly within the mold cavity
- The partition is smaller than the mold cavity.
- At least one of the molding materials is introduced through a sprue.
- A plunger is used to pressurize the molding material.
- A press is used as an actuator for the partition.
- Springs are used in conjunction with differential heating to promote flow of molding material through the partition.
- Using n-1 partitions to create a multi-material part having n layers.
- Using n-1 individually actuatable partitions to create a multi-material part consisting of n coplanar materials.

DETAILED DESCRIPTION

Figures 1A, 1B, 1C, 1D:
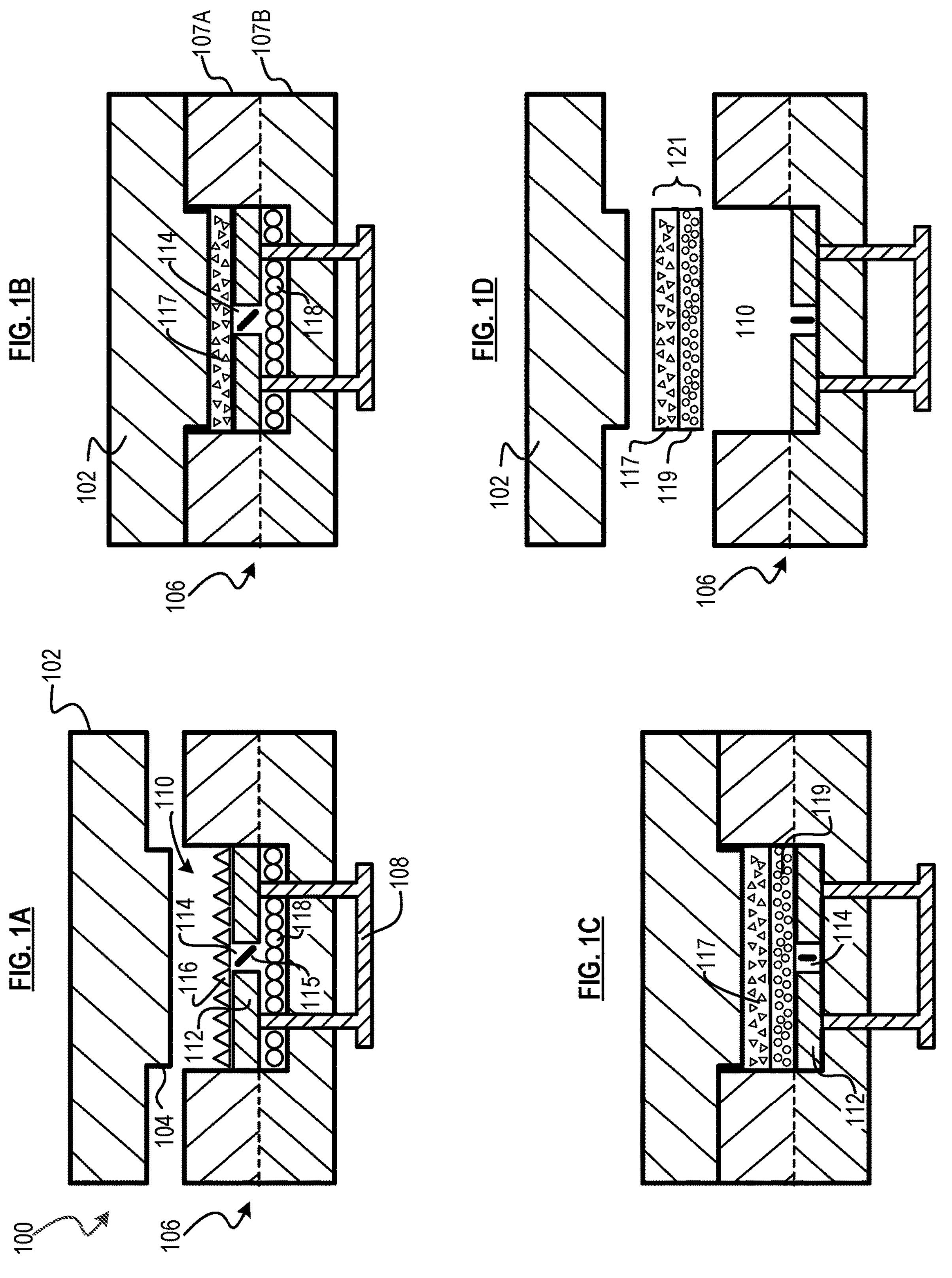
FIGS. 1A-1D depict a molding sequence and apparatus in accordance with an illustrative embodiment of the present invention, wherein all molding materials are placed in the mold tool prior to closure.

Embodiments of the invention, as described below and illustrated in the appended drawings, pertain to molding tools and methods for molding multi-material parts. As previously noted, such parts include a first molding material and a second molding material each comprising polymer resins.

In embodiments in which the first and second molding materials comprise different polymer resins, those resins must be "compatible" with one another. Miscible polymers blend with each other to create a single-phase structure with only one glass transition deflection temperature. However, most polymers form incompatible, immiscible blends with each other. This means they remain chemically distinct, and the resulting heterogeneous blend has two glass-transition temperatures. Compatible, immiscible blends, which result from strong ionic or van der Waals forces between the polymers, create a polymer blend that is macroscopically uniform. For embodiments of the present invention, "compatible" means "compatible immiscible blends" and "miscible blends" of polymers. Incompatible immiscible blends may be used in conjunction with the present invention, but in such embodiments, mechanical "locks" are used to bond them together.

It is notable that, for most embodiments and most applications, the melt temperature of the two resins will have "overlapping" melt-temperature profiles. In this context, that means that one of resins will not combust, off-gas, or otherwise degrade before the other resin melts. Most commercial polymers have a large melt-temperature range, thereby providing the requisite overlap and enabling use of many different combinations of polymer resins. However, in some other embodiments, two resins having non-overlapping melt-temperature profiles may suitably be used. This enables, for example, one of the polymer resins to be burned-off, dissolved out, or otherwise deliberately removed from the final part, resulting in a part having a mesh-like structure.

FIGS. 1A-1D depict molding tool 100, and a molding sequence for forming a multi-material part using the molding tool, in accordance with an illustrative embodiment of the present invention. Molding tool 100 includes top block 102 and bottom block 106. Mold cavity 110 is defined in bottom block 106. Top block includes male mold feature 104 that cooperates with mold cavity 110 to shape a part being molded. Molding tool 100 also includes partition 112, which is disposed in mold cavity 110. Partition 112 includes opening 114, and partition actuator 108.

In this embodiment, partition 112 is sized to fit relatively snugly within mold cavity 110, such that there is minimal clearance between the perimeter of partition 112 and the inside surface of cavity 110. Such sizing effectively fluidically isolates the region of cavity 110 below partition 112 from the region of the cavity above the partition. Partition 112 includes opening 114, which enables a flow of liquid molding material from one side of the partition to the other side.

In some embodiments, opening 114 includes flow-control mechanism 115, such as a one-way valve, (e.g., a check valve, etc.). In such embodiments, flow-control mechanism 115 is remotely actuated, such as hydraulically or pneumatically through a control system. Alternatively, the valve may be spring loaded, etc., such that the pressure exerted by liquefied molding material can force the valve open to enable flow through opening 114. In some other embodiments, no flow-control mechanism is present in opening 114. In such embodiments, molding material is urged to flow through opening 114 when pressure is applied to liquefied molding material, such as via movement of partition 112 or another element (e.g., a plunger, etc.). Although many of the accompanying figures depict embodiments of a molding tool in which flow-control mechanism 115 is present within opening 114, it is to be understood that in each of such embodiments, the molding tool will function in the absence of a flow-control mechanism.

In the embodiment depicted in FIGS. 1A-1D, partition 112 is actuated, via actuator 108, to move along the same axis as top block 102; that is, vertically through mold cavity 110. Actuator 108 can be driven pneumatically, electrically, hydraulically, etc.

In the embodiment depicted in FIG. 1A, both first molding material 116 and second molding material 118 are placed in mold cavity 110 before sealing mold cavity 110.

First molding material 116 is referred to as the "first shot" ("$1^{st}$ shot 116") because it is the first material being processed. Analogously, second molding material 118 is referred to as the "second shot" ("$2^{nd}$ shot 118"). As depicted in FIG. 1A, in this embodiment, $2^{nd}$ shot 118 is positioned below partition 112 and $1^{st}$ shot 116 is positioned above the partition.

The temperature of $1^{st}$ shot 116 is raised so that the resin therein melts. This is accomplished by raising the temperature of portions of molding tool 100. For example, in some embodiments, top block 102, and optionally partition 112 (or the portion of the partition—in this case upper portion—that abuts $1^{st}$ shot 116), and upper portion 107A of lower block 106 is heated to melt the resin. Any of a variety of known techniques for heating may suitably be used (e.g., internal fluidic channels, resistive heating elements, etc.). In embodiments in which partition 112 does not include heating capability, it is formed from thermally insulating materials. The use of a thermally insulating material facilitates differential heating or cooling as between $1^{st}$ shot 116 and $2^{nd}$ shot 118 on opposite sides of partition 112.

Referring now to FIG. 1B, top block 102 is actuated to move downwardly towards mold cavity 110, closing the mold cavity. Top block 102 can be actuated (for closing and opening) in any of a variety of ways as are known in the art. Male mold feature 104 extends into mold cavity 110. With $1^{st}$ shot 116 in a liquid state, and the pressure applied by the presence of male mold feature 104, the $1^{st}$ shot is consolidated.

In the molding arts, the term "consolidation" means that in a grouping of resin pellets or a resin-impregnated fiber bundles, void space is removed to the extent possible and as is acceptable for a final part. This usually requires significantly elevated pressure in addition to elevated temperature (required for thermoplastics to melt the resin). The compression molding process includes "dwelling" (i.e., holding) at processing temperature and pressure for a few minutes. Compression molding is conducted at a temperature that is typically in the range of about 150° C. to about 400° C., as a function of the melting temperature of the thermoplastic resin being used. Typical compaction pressure is between 1000 to 3000 psi. Elevated temperature and pressure is maintained for a few minutes, followed by cooling.

After an appropriate dwell at processing temperature and pressure, the temperature of top block 102, the top half of bottom block 106, and, optionally, the top of partition 112 is reduced to less than the heat deflection temperature of the resin in the $1^{st}$ shot, so that the viscosity of the material is sufficiently high to inhibit flow. First molded portion 117 results.

In some embodiments, both the temperature of $1^{st}$ shot 116 and $2^{nd}$ shot 118 are raised at the same time. However, in such embodiments and to the extent possible, the temperature of $2^{nd}$ shot 118 remains elevated, and the $2^{nd}$ shot remains liquefied, as $1^{st}$ shot 116 reduced to below its heat deflection temperature via cooling. As those skilled in the art will appreciate, although materials must be in a certain state (i.e., flowable or not flowable) as a function of the processing cycle, the extent to which a material is melted or solidified will take into account process efficiency; that is, the impact on cycle time, etc.

Regardless of whether the two shots are liquefied serially or at the same time, it will be appreciated that the aforementioned processing requires some level of thermal isolation between the various blocks (i.e., top block 102 and bottom block 106) and/or regions within an individual block (such as regions 107A and 107B of bottom block 106). In some embodiments, the top block, and discrete portions (e.g., portion 107A and 107B) of the bottom block of molding tool 100 can be individually heated and cooled as necessary. Moreover, this approach can be supplemented by creating a lattice structure that acts as a thermal insulator between the various heating/cooling zones. In a further embodiment, air gaps, functioning as thermal insulators, or actual thermally insulating material, is positioned between the blocks, or at various regions within an individual block, to facilitate regional temperature control.

With reference now to FIG. 1C, the mold remains closed and $2^{nd}$ shot 118 is liquefied, such as by heating lower portion 107B of bottom block 106, and optionally the lower portion of partition 112. Flow-control mechanism 115 is actuated to permit flow through opening 114, and the partition is actuated to move downwardly, applying pressure to the liquefied $2^{nd}$ shot. This causes $2^{nd}$ shot 118 to move through opening 114 into contact with first molded portion 117, and to consolidate under the applied pressure. If flow-control mechanism 115 is spring loaded, actuation thereof is simply due to pressure exerted thereon by the liquefied (and pressurized) $2^{nd}$ shot. After an appropriate dwell at temperature and pressure, the temperature of any of the elements of molding tool 100 that were raised to liquefy the $2^{nd}$ shot are now reduced to a temperature lower than the heat deflection temperature of the resin in the $2^{nd}$ shot. Second molded portion 119, which is formed as a layer adjacent to first molded portion 117, results.

As depicted in FIG. 1D, after cooling, mold cavity 110 is unsealed by raising top block 102. Multi-material part 121, including first molded portion 117 and second molded portion 119, is ejected from the mold cavity.

FIGS. 2A-2D depict molding tool 200, and a molding sequence for forming a multi-material part using the molding tool, in accordance with an illustrative embodiment of the present invention. Molding tool 200 includes top block 202 and bottom block 106. Mold cavity 110 is defined in bottom block 106. Top block 202 includes male mold feature 104 that cooperates with mold cavity 110 to shape a part being molded. Top block 202 further includes sprue 220 for introducing molding material into mold cavity 110. Molding tool 200 includes partition 112, which is disposed in mold cavity 110 and, as in the previous embodiment, is sized for minimal clearance therein. Partition 112 includes opening 114, flow-control mechanism 115, and partition actuator 108.

This embodiment depicts a tool and a molding sequence similar to what is depicted in FIGS. 1A-1D, but rather than starting the process with both shots in mold cavity 110, the 1$^{st}$ shot is added through sprue 220 after mold cavity 110 is sealed.

Figures 2A, 2B, 2C, 2D:
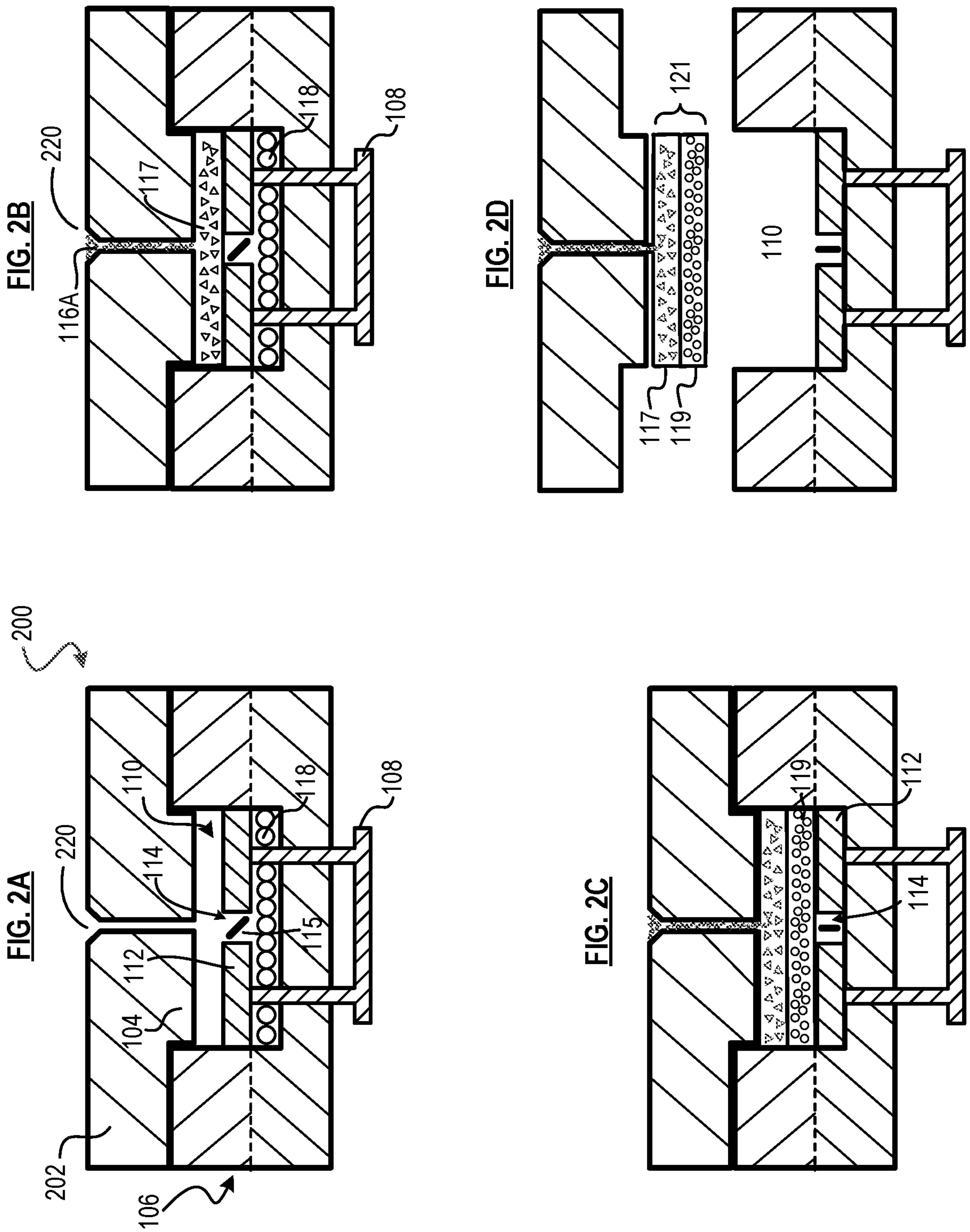
FIGS. 2A-2D depict a molding sequence and apparatus in accordance with an illustrative embodiment of the present invention, wherein one of the molding materials is injected into the mold tool after closure.

Referring to FIG. 2A, 2$^{nd}$ shot 118 is added to mold cavity 110 below partition 112 (while the mold cavity is open). Mold cavity 110 is then sealed. The temperature of top block 202 is adjusted to the processing temperature of the 1$^{st}$ shot.

With reference to FIG. 2B, 1$^{st}$ shot 116A is injected into mold cavity 110 through sprue 220, and rapidly solidifies to form first molded portion 117, since bottom block 106 is much cooler than 1$^{st}$ shot 116A. Any of variety of injection devices, as are known in the art, are used to inject 1$^{st}$ shot 116A into sprue 220.

Referring now to FIG. 2C, after forming first molded portion 117, 2$^{nd}$ shot 118 is liquefied by increasing the temperature of at least the lower portion of bottom block 106 and, optionally, partition 112. Flow-control mechanism 115 is actuated to permit flow through opening 114, and partition 112 is actuated to move downwardly, applying pressure to the now liquefied 2$^{nd}$ shot. This causes 2$^{nd}$ shot 118 to move through opening 114 into contact with first molded portion 117, and to consolidate under the applied pressure. After dwelling at temperature and pressure for the requisite amount of time, the temperature of any of the elements of molding tool 200 that were raised to liquefy the 2$^{nd}$ shot are now reduced to a temperature lower than the heat deflection temperature of the resin in the 2$^{nd}$ shot. Second molded portion 119, which is formed as a layer adjacent to first molded portion 117, results.

As depicted in FIG. 2D, after cooling, mold cavity 110 is opened by raising top block 202, and multi-material part 121, including first molded portion 117 and second molded portion 119, is ejected from the cavity. Any solidified resin remaining in sprue 220 after part 121 is molded is removed manually.

FIGS. 3A-3D depict molding tool 300, and a molding sequence for forming a multi-material part using the molding tool, in accordance with an illustrative embodiment of the present invention. Molding tool 300 includes top block 102 and bottom block 306. Top block 102 includes male mold feature 104. Mold cavity 110 is defined in bottom block 306. As for the previously described embodiments, partition 112 is disposed within mold cavity 110 and is sized for minimal clearance therein. Partition 112 includes opening 114, flow-control mechanism 115, and partition actuator (not depicted for clarity of illustration).

Depending on the form and composition of 2$^{nd}$ shot 118, the movement of partition 112 might be insufficient to fully transfer and fully consolidate the 2$^{nd}$ shot. To that end, bottom block 306 also includes, below mold cavity 110, plunger cavity 309, which is fluidically coupled to mold cavity 110. Plunger 322 is slidably disposed in plunger cavity 309. Plunger 322 facilitates the transfer and consolidation of 2nd shot 118. Moreover, depending upon design specifics, the presence of plunger 322 may reduce the amount of movement required of partition 112. This is advantageous because it reduces the overall height of molding tool 300, thereby reducing thermal mass. Plunger 322 can be used in conjunction with any of the embodiments described in this specification, in the manner and for the purposes described above.

Figures 3A, 3B, 3C, 3D:
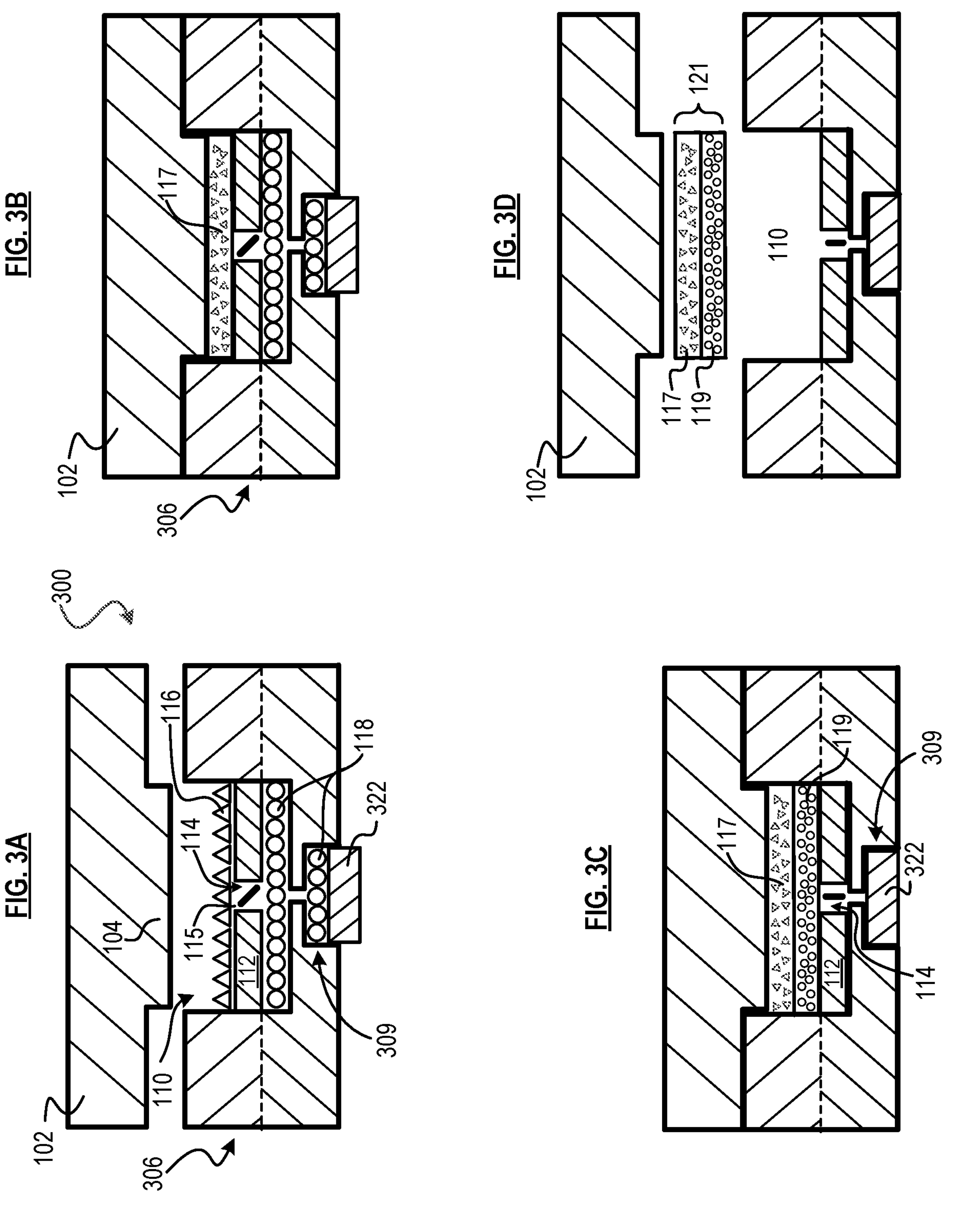
FIGS. 3A-3D depict a molding sequence and apparatus in accordance with a first alternative embodiment, wherein the apparatus includes a plunger.

As depicted in FIG. 3A, 2$^{nd}$ shot 118 is positioned below partition 112, and 1$^{st}$ shot 116 is positioned above the partition. Additionally, some of 2$^{nd}$ shot 118 is disposed above plunger 322 in plunger cavity 309.

Referring now to FIG. 3B, top block 102 is actuated to move downwardly towards mold cavity 110, closing the mold cavity. The 1$^{st}$ shot 116 is liquefied in the manner previously described, and consolidated by virtue of the pressure applied by male mold feature 104. After an appropriate dwell at processing temperature and pressure, the temperature of any of the elements of molding tool 300 that were raised to liquefy the 1$^{st}$ shot are now reduced to a temperature lower than the heat deflection temperature of the resin in the 1st shot. First molded portion 117 results.

In FIG. 3C, the temperature of appropriate portions of molding tool 300 are raised to liquefy 2$^{nd}$ shot 118. Flow-control mechanism 115 is actuated to permit flow through opening 114. Plunger 322 is actuated, moving “upwardly” in plunger cavity 309, applying pressure to the liquefied 2$^{nd}$ shot. This causes 2$^{nd}$ shot 118 to move through opening 114 into contact with first molded portion 117, and for partition 112 to drop to the bottom of mold cavity 110. The 2$^{nd}$ shot 118 is consolidated under the pressure applied by plunger 322. After dwelling at temperature and pressure for the requisite amount of time, the temperature of any of the elements of molding tool 300 that were raised are now reduced to a temperature lower than the heat deflection temperature of the resin in the 2$^{nd}$ shot. Second molded portion 119, which is formed as a layer adjacent to first molded portion 117, results.

As depicted in FIG. 3D, after cooling, mold cavity 110 is opened by raising top block 102, and multi-material part 121, including first molded portion 117 and second molded portion 119, is ejected from the cavity.

FIGS. 4A-4D depict molding tool 400, and a molding sequence for forming a multi-material part using the molding tool, in accordance with an illustrative embodiment of the present invention. In multi-material molded part 121 formed in accordance with the previously described embodiments, first molded portion 117 and second molded portion 119 are co-extensive, having the same size as one another. In contrast, molding tool 400 is capable of fabricating a multi-material part in which the first and second molded portions are not equal in size. This is achieved, in this particular embodiment, via an appropriately configured mold cavity 410.

Figure 4A:
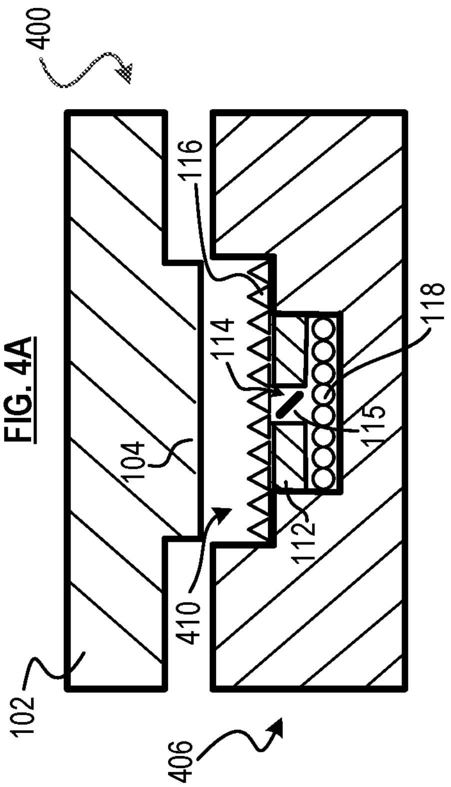
FIGS. 4A-4D depict a molding sequence and apparatus in accordance with a second alternative embodiment wherein a part having multiple layers each with a different length is formed.

As depicted in FIG. 4A, molding tool 400 includes top block 102 and bottom block 406. Top block 102 includes male mold feature 104. Mold cavity 410 is defined in bottom block 406. Mold cavity 410 has a stepped profile, wherein the upper portion of cavity 410 is wider than the lower portion of the cavity. Partition 112 is sized to fit within the narrower, lower portion of mold cavity 410, and is sized for minimal clearance therein. Partition 112 includes opening 114, flow-control mechanism 115, and partition actuator (not depicted for clarity of illustration).

Figure 4B:
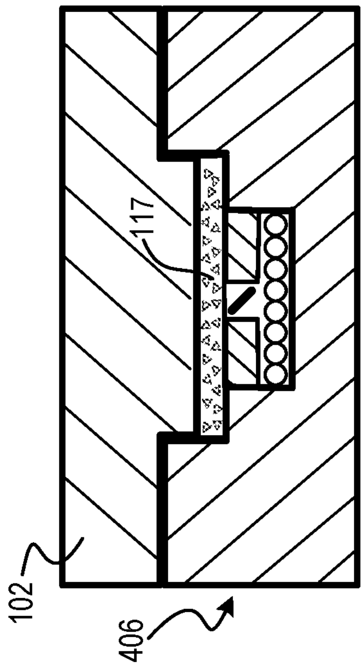

The molding operation proceeds as described with respect to FIGS. 1A-1D. In particular, 1$^{st}$ shot 116 is liquefied, and consolidated by pressure applied by male mold feature 104 of top block 102. After an appropriate dwell at processing temperature and pressure, the temperature of any of the elements of molding tool 400 that were raised for liquefying 1$^{st}$ shot 116 are now reduced to a temperature lower than the heat deflection temperature of the resin in the 1st shot. First molded portion 117 results, as depicted in FIG. 4B.

Figure 4C:
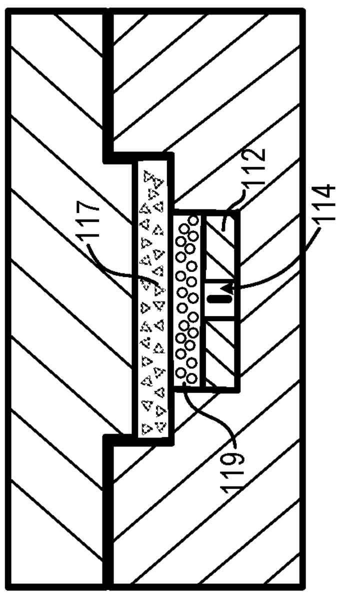

Referring now to FIG. 4C, after forming first molded portion 117, 2$^{nd}$ shot 118 is liquefied by increasing the temperature of at least the lower portion of bottom block 406 and, optionally, partition 112. Flow-control mechanism 115 is actuated to permit flow through opening 114, and partition 112 is actuated to move downwardly, applying pressure to the liquefied $2^{nd}$ shot. This causes $2^{nd}$ shot 118 to move through opening 114 into contact with first molded portion 117, and to consolidate under the applied pressure. The $2^{nd}$ shot 118 remains in the relatively smaller, lower portion of mold cavity 110. After dwelling at temperature and pressure for the requisite amount of time, the temperature of any of the elements of molding tool 400 that were raised to liquefy the $2^{nd}$ shot are now reduced to a temperature lower than the heat deflection temperature of the resin in the $2^{nd}$ shot. Second molded portion 119, which is formed as a smaller layer adjacent to first molded portion 117, results.

Figure 4D:
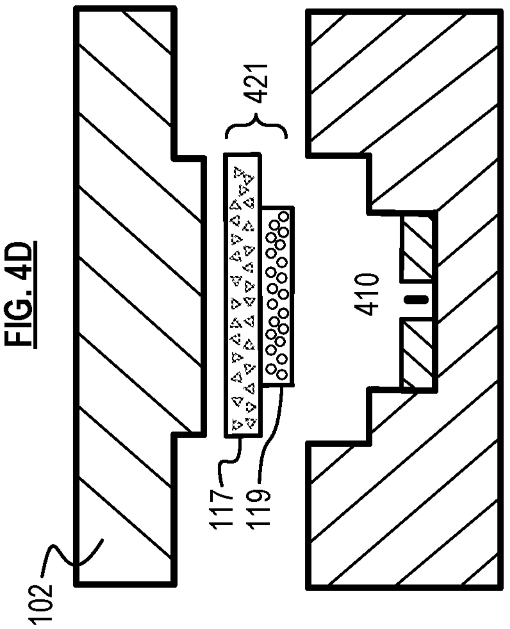

As depicted in FIG. 4D, after cooling, mold cavity 410 is opened by raising top block 102, and multi-material part 421, including relatively larger first molded portion 117 and relatively smaller second molded portion 119, is ejected from cavity 110.

FIGS. 5A-5D depict molding tool 500, and a molding sequence for forming a multi-material part using the molding tool, in accordance with an illustrative embodiment of the present invention. Molding tool 500 enables the fabrication of multi-material part having a uniform multi-material thickness. In other words, rather than creating a second layer using a $2^{nd}$ shot, the two shots result in two material portions that are coplanar with respect to one another.

In the embodiment depicted in FIGS. 5A-5D, bottom block 506 has a cavity similar to the cavity of molding tool 400 depicted in FIGS. 4A-4D, although the narrower, lower portion of the cavity of the present embodiment is not as deep as the lower cavity of molding tool 400. That is because for molding tool 400, partition 112 must reside within the lower portion of the cavity, above $2^{nd}$ shot 118, while $1^{st}$ shot 116 is being processed. But that is not the case for molding operations in molding tool 500. Rather, in molding tool 500, partition 112 is positioned in the upper, larger-width portion cavity, with $1^{st}$ shot 116 disposed around the perimeter of the partition, per FIG. 5A.

Figures 5A, 5B, 5C, 5D:
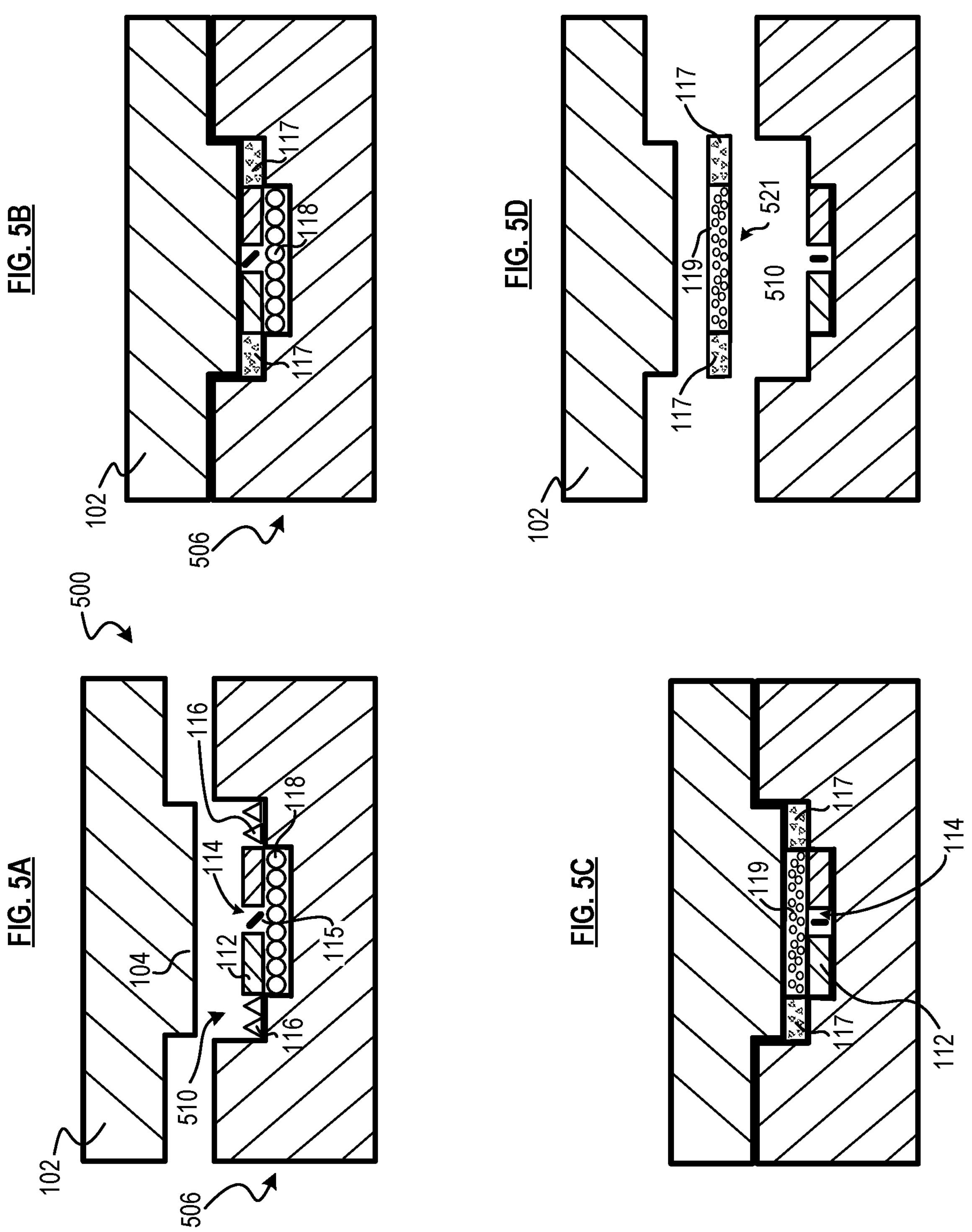
FIGS. 5A-5D depict a molding sequence and apparatus in accordance with a third alternative embodiment wherein a part having two co-planar materials with distinct interfaces therebetween is formed.

As depicted in FIG. 5B, top block 102 seals cavity 510, and, after liquefication, $1^{st}$ shot 116 is consolidated and then cooled to create first molded portion 117 having an annular form that surrounds partition 112.

After forming first molded portion 117, $2^{nd}$ shot 118 is processed. The $2^{nd}$ shot is liquefied and flow-control mechanism 115 is actuated to permit flow through opening 114. Partition 112 is actuated (actuator not depicted) to move downwardly, applying pressure to the liquefied $2^{nd}$ shot. This causes $2^{nd}$ shot 118 to move through opening 114 and fill the region bounded by first molded portion 117, as per FIG. 5C. The $2^{nd}$ shot is consolidated and cooled, resulting in multi-material part 521, including coplanar first molded portion 117 and second molded portion 119, as depicted in FIG. 5D.

FIGS. 6A-6E depict molding tool 600, and a molding sequence for forming a multi-material part using the molding tool, in accordance with an illustrative embodiment of the present invention. Like molding tool 500 of FIGS. 5A-5D, molding tool 600 provides a multi-material part wherein the molded portions are coplanar. However, using two partitions, molding tool 600 provides a multi-material part made from three different molding materials. Using an appropriately configured mold cavity, a multi-material part consisting of n coplanar materials, with well-defined boundaries between materials, is formed using n-1 individually actuatable partitions.

Figures 6A, 6B, 6C, 6D, 6E:
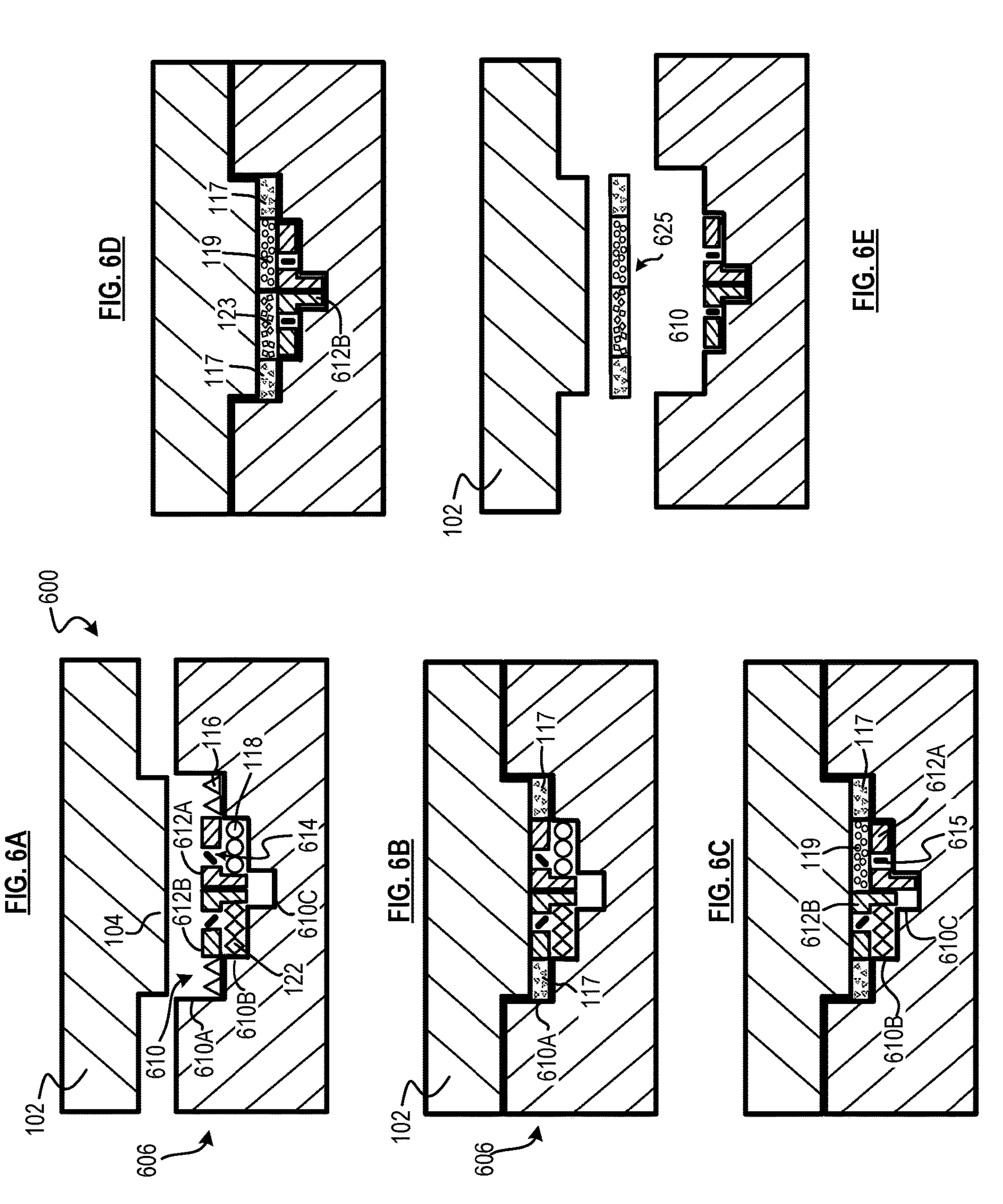
FIGS. 6A-6E depict a molding sequence and apparatus in accordance with a fourth alternative embodiment wherein a part having three co-planar materials with distinct interfaces therebetween is formed.

As depicted in FIG. 6A, molding tool 600 includes top block 102 and bottom block 606. Top block 102 includes male mold feature 104. Mold cavity 610 is defined in bottom block 606. Mold cavity 610 has a stepped profile, including three portions: upper and largest cavity portion 610A, intermediate (in location and size) cavity portion 610B, and bottom and smallest cavity portion 610C.

Molding tool 600 includes two partitions, partition 612A and partition 612B, wherein the partitions are individually movable and each includes opening 614 with flow-control mechanism 615 therein.

As depicted in FIG. 6A, $1^{st}$ shot 116 is positioned within upper cavity portion 610A, radially outward of partitions 612A and 612B, which, at this point in the processing, are positioned side-by-side one another. The partitions extend into intermediate cavity portion 610B, to segregate $2^{nd}$ shot 118 and $3^{rd}$ shot 122 from one another.

As depicted in FIG. 6B, top block 102 seals cavity 610, and, after liquefication, $1^{st}$ shot 116 is consolidated and then cooled to create first molded portion 117 having an annular form that surrounds partitions 612A and 612B.

The processing of additional shots is sequenced based on the melt temperature of the polymer resin of each shot (higher melting-point material is processed before lower melting-point material).

Referring now to FIG. 6C, after forming first molded portion 117, $2^{nd}$ shot 118 is liquefied, and flow-control mechanism 615 is actuated to permit flow through opening 614 of partition 612A. Partition 612A is actuated to move downwardly, applying pressure to the liquefied $2^{nd}$ shot. This forces $2^{nd}$ shot 118 through opening 614 into contact with first molded portion 117, and to consolidate under the applied pressure. After dwelling at temperature and pressure for the requisite amount of time, the temperature of any of the elements of molding tool 600 that were raised to liquefy the $2^{nd}$ shot are now reduced to a temperature lower than the heat deflection temperature of the resin in the $2^{nd}$ shot. Second molded portion 119, which is adjacent to and coplanar with first molded portion 117, results.

With reference to FIG. 6D, after forming second molded portion 119, $3^{rd}$ shot 122 is liquefied, and flow-control mechanism 615 is actuated to permit flow through opening 614 of partition 612B. Partition 612B is actuated to move downwardly, applying pressure to the liquefied $3^{rd}$ shot. This forces $3^{rd}$ shot 122 through opening 614 into contact with first molded portion 117 and second molded portion 119, and consolidates it under the applied pressure. After dwelling at temperature and pressure for the requisite amount of time, the temperature of any of the elements of molding tool 600 that were raised to liquefy the $3^{rd}$ shot are now reduced to a temperature lower than the heat deflection temperature of the resin in the $3^{rd}$ shot. Third molded portion 123 results.

As depicted in FIG. 6E, after cooling, mold cavity 610 is opened by raising top block 102, and multi-material part 625, including coplanar first molded portion 117, second molded portion 119, and third molded portion 123 results.

FIGS. 7A-7E depict molding tool 700, and a molding sequence for forming a multi-material part using the molding tool, in accordance with an illustrative embodiment of the present invention. In the embodiment depicted in FIGS. 7A-7E, molding tool 700 is used to create a multi-material part having three layers of three different materials. More generally, the illustrated molding sequence can be used to fabricate a multi-material part having n layers, each layer comprising a different material, from n-1 partitions.

Figures 7A, 7B, 7C, 7D, 7E:
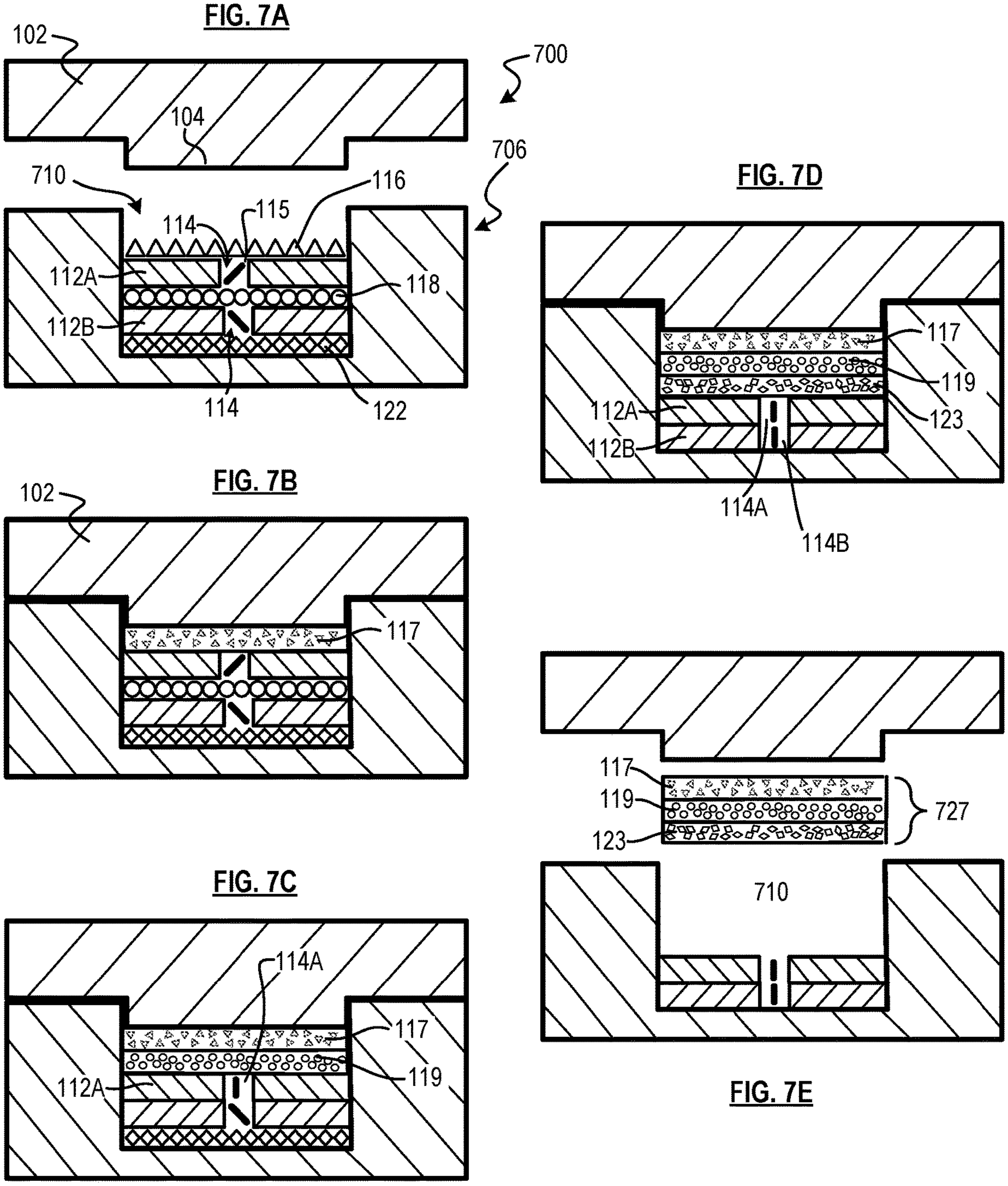
FIGS. 7A-7E depict a molding sequence and apparatus in accordance with a fifth alternative embodiment wherein a part having three layers is formed.

As depicted in FIG. 7A, molding tool 700 includes top block 102 and bottom block 706. Top block 102 includes male mold feature 104. Mold cavity 710 is defined in bottom block 706. Mold cavity 710 has a uniform diameter/width. In other implementations of this embodiment, the diameter/width of the mold cavity is not uniform, which would result in the various material layers have different sizes.

Mold cavity 710 includes two partitions, one above the other, each having opening 114 and flow-control mechanism 115 therein. Prior to sealing mold cavity 710, 1$^{st}$ shot 116 is positioned above upper partition 112A, 2$^{nd}$ shot 118 is positioned between upper partition 112A and lower partition 112B, and 3$^{rd}$ shot 122 is positioned beneath lower partition 112B.

Referring now to FIG. 7B, the molding tool is actuated to move top block 102 downwards, sealing mold cavity 710. The 1$^{st}$ shot 116 is liquefied, and consolidated via the pressure applied by male mold feature 104. After an appropriate dwell at processing temperature and pressure, the temperature is reduced to below the heat deflection temperature of the resin in the 1$^{st}$ shot, forming first molded portion 117.

With reference now to FIG. 7C, 2$^{nd}$ shot 118 is liquefied. Flow-control mechanism 115 in upper partition 112A is actuated to permit flow through opening 114. Partition 112A is actuated to move downwardly, applying pressure to the liquefied 2$^{nd}$ shot. This forces 2$^{nd}$ shot 118 through opening 114 into contact with first molded portion 117, and consolidates it under the applied pressure. After dwelling at temperature and pressure for the requisite amount of time, the temperature of any of the elements of molding tool 700 that were raised to liquefy the 2$^{nd}$ shot are now reduced to a temperature lower than the heat deflection temperature of the resin in the 2$^{nd}$ shot. Second molded portion 119 results.

Referring now to FIG. 7D, 3rd shot 122 is liquefied. The flow-control mechanism in lower partition 112B is actuated to permit flow through opening 114. Both of partitions 112A and 112B are actuated to move downwardly (alternatively, downward movement of upper partition 112A causes lower partition 112B to move downwardly) to transfer liquefied 3$^{rd}$ shot 122 through the openings in both partitions to contact second molded portion 119. The 3$^{rd}$ shot is then consolidated by the applied pressure. After dwelling at temperature and pressure for the requisite amount of time, the temperature of any of the elements of molding tool 700 that were raised to liquefy the 3rd shot are now reduced to a temperature lower than the heat deflection temperature of the resin in the 3rd shot. Third molded portion 123 results.

As depicted in FIG. 7E, top block 102 is removed, and multi-material part 727 having three different layers, each comprising a different material, is ejected from cavity 710.

FIGS. 8A-8E depict molding tool 800, and a molding sequence for forming a multi-material part using the molding tool, in accordance with an illustrative embodiment of the present invention. In most of the embodiments previously described, movement of the partition creates a pressure differential that forces the 2$^{nd}$ shot through the opening therein. However, when using molding tool 800 in accordance with the present teachings, injection of the 2$^{nd}$ shot does not result from movement of the partition. Although the partition is moved to create void space within the cavity for the 2$^{nd}$ shot, an injection system is used to inject the 2$^{nd}$ shot into that void space. And in accordance with this embodiment, an opening is not required in the partition.

Figure 8A:
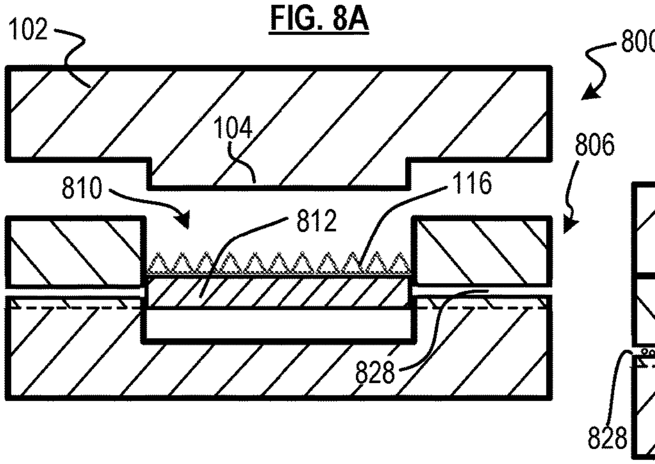
FIGS. 8A-8E depict a molding sequence and apparatus in accordance with a sixth alternative embodiment wherein a secondary injection system is used to inject a second molding material, wherein a partition creates a cavity for receiving the second molding material.

As depicted in FIG. 8A, molding tool 800 includes top block 102 and bottom block 806. Top block 102 includes male mold feature 104. Mold cavity 810 is defined in bottom block 806. Mold cavity 810 has a uniform diameter/width. Molding tool 800 also incorporates an injection system (pumps not depicted) for delivering liquefied molding material into mold cavity 810 after it is sealed by top block 102. The molding material is delivered via plural conduits 828 that penetrate the side of bottom block 806 and fluidically communicate with mold cavity 806. Partition 812 is disposed in mold cavity 806. The partition is actuated by a partition actuator, not depicted. Unlike previous embodiments, partition 812 does not include an opening, such as opening 114, which would otherwise permit passage of liquefied molding material from one side of the partition to the other. Prior to processing operations, partition 812 is positioned within cavity 810 so as to block the exit from conduits 828. The 1$^{st}$ shot 116 is disposed on partition 812.

Figure 8D:
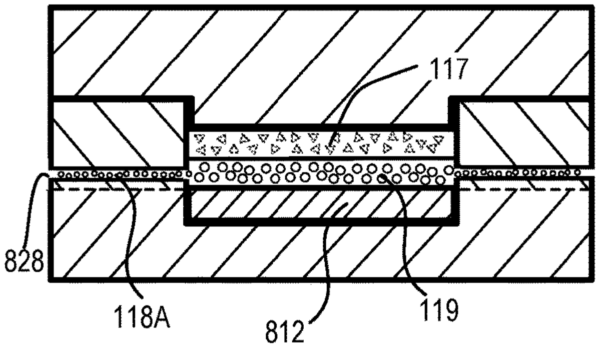
Figure 8B:
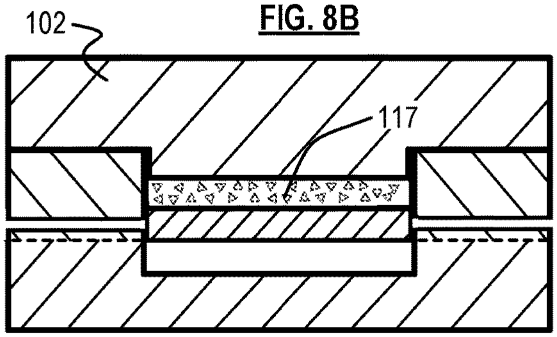

Referring now to FIG. 8B, top block 102 is moved downwardly to seal mold cavity 810. The 1$^{st}$ shot 116 is liquefied, and then consolidated via the pressure applied by male mold feature 104. After an appropriate dwell at processing temperature and pressure, the temperature is reduced to below the heat deflection temperature of the resin in the 1$^{st}$ shot, forming first molded portion 117.

Figure 8E:
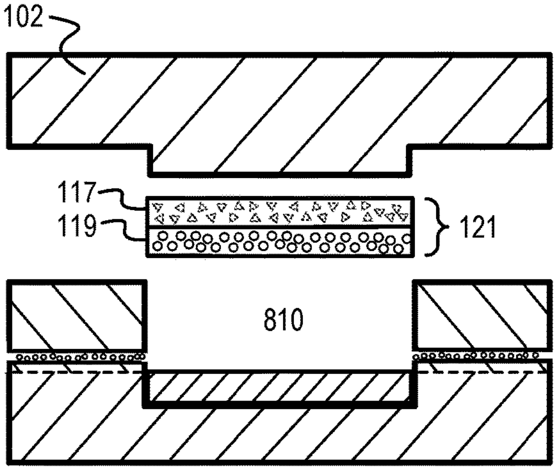
Figure 8C:
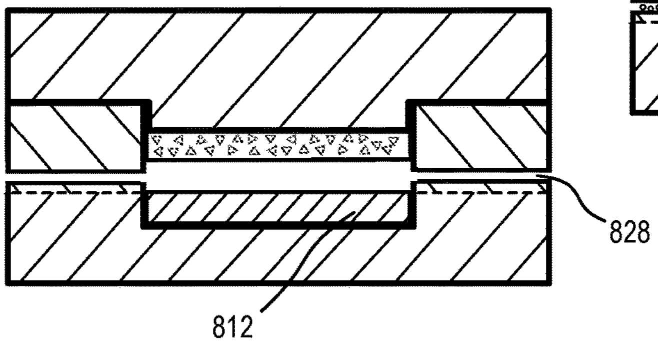

With reference to FIG. 8C, partition 812 is moved downwardly creating a void between first molded portion 117 (above) and partition 812 (below). As depicted in FIG. 8D, liquefied 2$^{nd}$ shot 118A is introduced through conduits 828 in bottom block 806. The 2$^{nd}$ shot is consolidated by the applied pressure and rapidly cools, forming second molded portion 119.

Referring to FIG. 8E, after cooling, mold cavity 810 is opened by raising top block 102. Multi-material part 121, including first molded portion 117 and second molded portion 119, in two discrete layers, is ejected from the cavity.

FIGS. 9A-9D depict molding tool 900, and a molding sequence for forming a multi-material part using the molding tool, in accordance with an illustrative embodiment of the present invention. In this embodiment, a press operatively engages the partition.

Figures 9A, 9B, 9C, 9D:
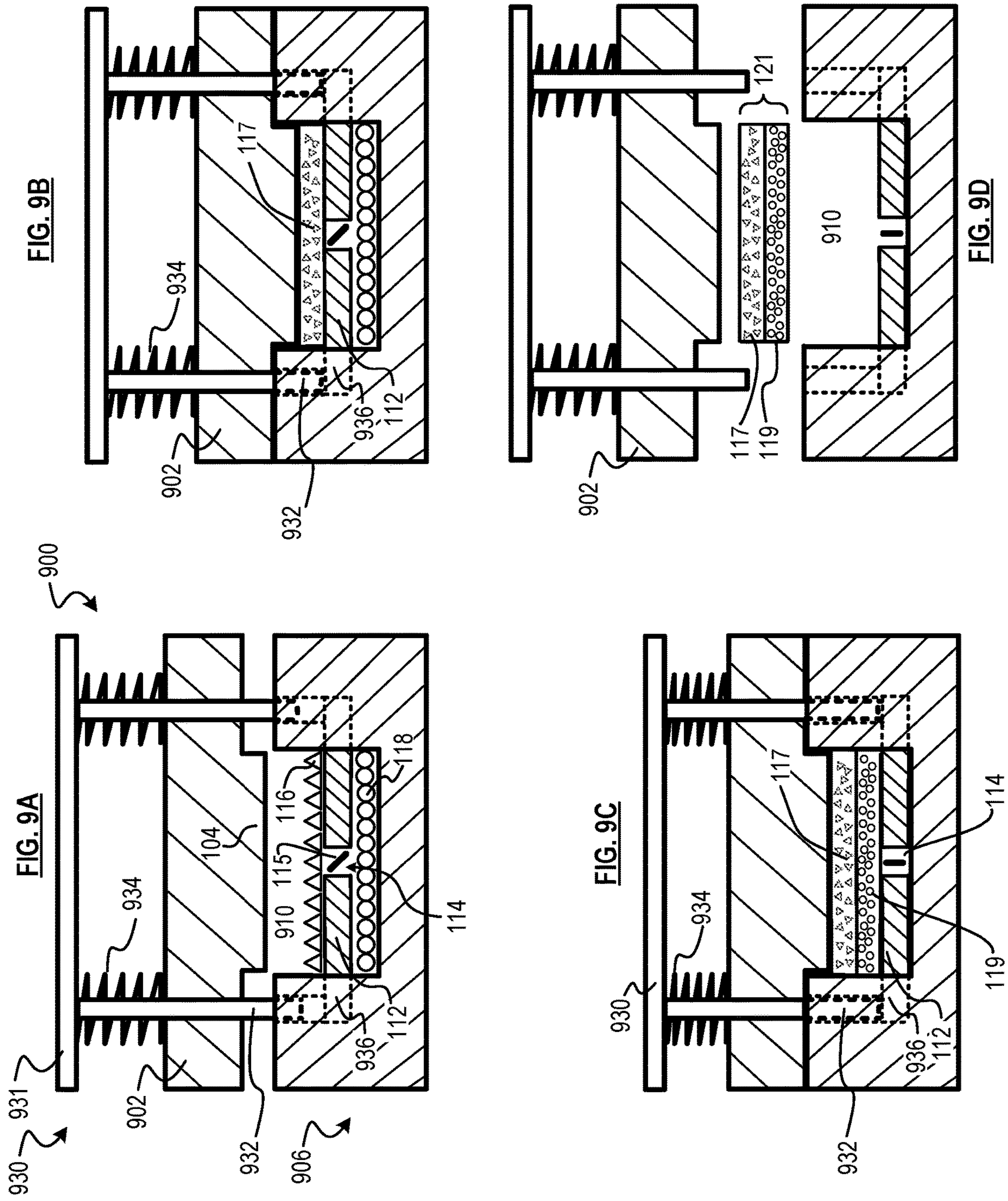
FIGS. 9A-9D depict a molding sequence and apparatus in accordance with a seventh alternative embodiment wherein a spring force is overcome to actuate movement of a partition.

As depicted in FIG. 9A, molding tool 900 includes top block 902 and bottom block 906. Mold cavity 910 is defined in bottom block 906. Mold cavity 810 has a uniform diameter/width. Molding tool 900 includes partition 112, which is disposed in mold cavity 910 and is sized for minimal clearance therein. Partition 112 includes opening 114, and optional flow-control mechanism 115. Partition 112 includes arms 936 that extend into bottom block 906. Top block 102 includes male mold feature 104.

Molding tool 900 also includes press 930, having plate 931, arms 932 and springs 934. The springs are disposed on top block 902 and support plate 931. Springs 934 resist downward movement of plate 931. Arms 932, which couple to plate 931, penetrate top block 902 and are received by holes in bottom block 906. Upon sufficient downward movement of press 930, arms 932 engage arms 936 of partition 112, and, with continued downward movement of the press, cause partition 112 to move downwardly. Press 930 thus serves as an actuator for partition 112.

In FIG. 9B, top block 902 is moved downwardly to seal mold cavity 910. The 1$^{st}$ shot 116 is liquefied, and is consolidated via the pressure applied by male mold feature 104. After an appropriate dwell at processing temperature and pressure, the temperature is reduced to below the heat deflection temperature of the resin in the 1$^{st}$ shot, forming first molded portion 117. At this point in the process, press 930 has not yet actuated partition 112.

Referring now to FIG. 9C, 2$^{nd}$ shot 118 is liquefied. Flow-control mechanism 115 in partition 112 is actuated to permit flow through opening 114. Partition 112A is actuated to move downwardly, applying pressure to the liquefied 2$^{nd}$ shot. Force is applied to press 930, compressing springs 934. As press 930 advances, arms 932 of the press apply downward force to arms 936 of partition 112, forcing the partition downward in cavity 910. The pressure applied by downwardly moving partition 112 drives liquefied $2^{nd}$ shot 118 through opening 114 in the partition. The $2^{nd}$ shot contacts first molded portion 117 and consolidates under the applied pressure. After dwelling at temperature and pressure for the requisite amount of time, the temperature of any of the elements of molding tool 900 that were raised to liquefy the $2^{nd}$ shot are now reduced to a temperature lower than the heat deflection temperature of the resin in the $2^{nd}$ shot. Second molded portion 119 results.

After cooling, compressive force on press 930 is released and molding tool 900 is opened, as depicted in FIG. 9D. Multi-material part 121, including first molded portion 117 and second molded portion 119, in two discrete layers, is ejected from the cavity.

FIGS. 10A-10D depict molding tool 1000, and a molding sequence for forming a multi-material part using the molding tool, in accordance with an illustrative embodiment of the present invention. In this embodiment, springs are used, in conjunction with differential heating, to form a multi-material part.

Figures 10A, 10B, 10C, 10D:
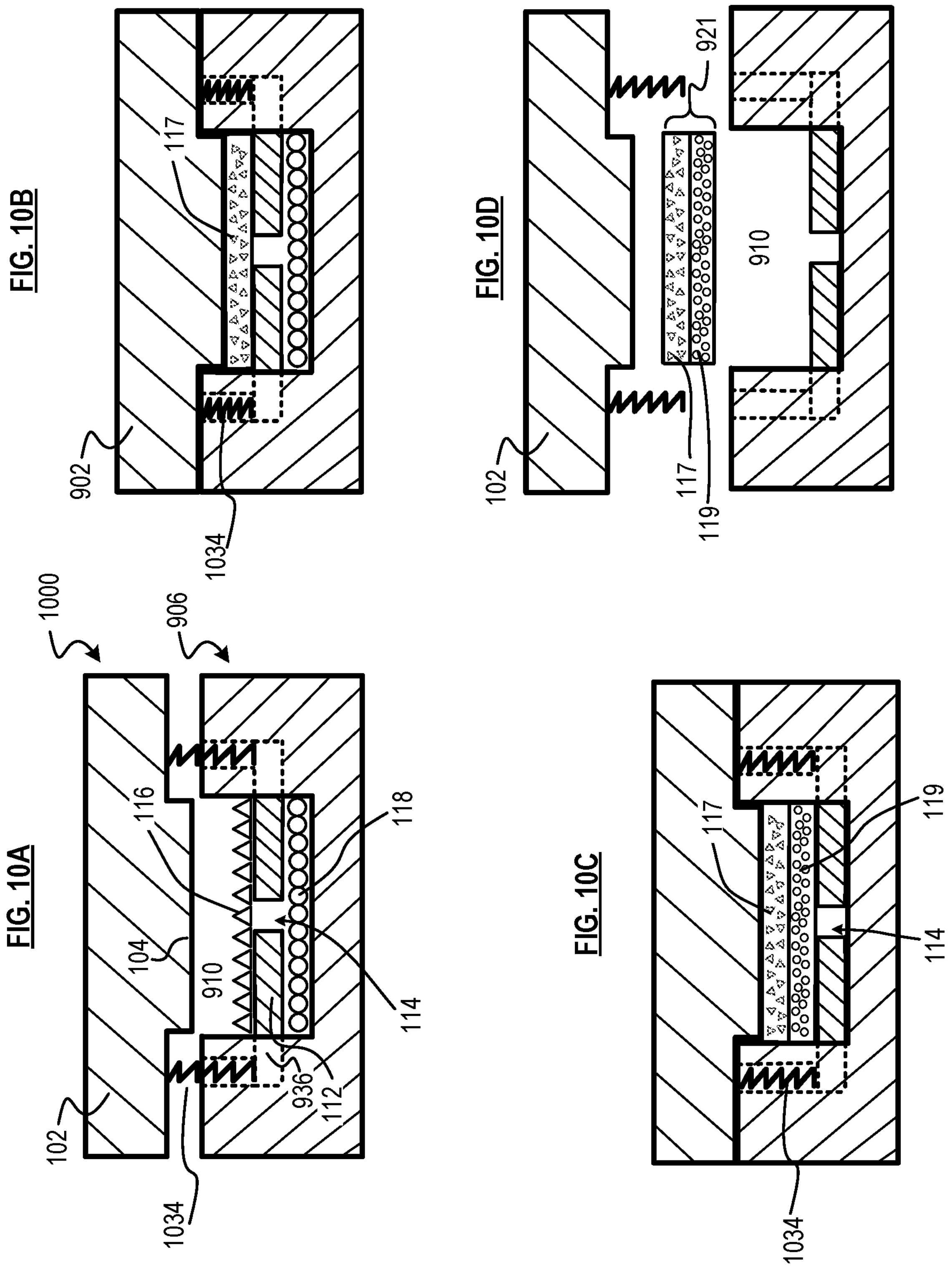
FIGS. 10A-10D depict a molding sequence and apparatus in accordance with an eighth alternative embodiment wherein, in conjunction with differential heating, a spring force actuates movement of a partition.

As depicted in FIG. 10A, molding tool 1000 includes top block 102 and bottom block 906. Mold cavity 910 is defined in bottom block 906. Mold cavity 910 has a uniform diameter/width. Molding tool 1000 includes partition 112, which is disposed in mold cavity 910 and is sized for minimal clearance therein. Partition 112 includes opening 114. In this embodiment, flow control mechanism 115 is not included in opening 114. Partition 112 includes arms 936 that extend into bottom block 906. Top block 102 includes male mold feature 104.

As depicted in FIG. 10A, springs 1034 are positioned between a bottom surface of top block 102 and the top surface of arms 936 of partition 112. Within cavity 910, $1^{st}$ shot 116 is positioned above partition 112 and $2^{nd}$ shot 118 is positioned below the partition.

Referring to FIG. 10B, top block 102 is moved downwardly to seal mold cavity 910. Sealing the mold cavity compresses springs 1034. The $1^{st}$ shot 116 is liquefied, and is consolidated via the pressure applied by male mold feature 104. After an appropriate dwell at processing temperature and pressure, the temperature is reduced to below the heat deflection temperature of the resin in the $1^{st}$ shot, forming first molded portion 117.

Referring now to FIG. 10C, $2^{nd}$ shot 118 is liquefied, such as by heating the lower portion of bottom block 906. Prior to liquefication, $2^{nd}$ shot 118 supports partition 112 in its initial position. In some embodiments, such as those in which additional precision is required, a hard stop can be used below partition 112 to maintain it in position as long as necessary. In its liquefied state, the $2^{nd}$ shot flows readily through opening 114 due to the pressure imparted by partition 114, as applied to the partition by springs 1034.

With reference to FIG. 10D, after cooling, molding tool 1000 is opened and multi-material part 121, including first molded portion 117 and second molded portion 119, in two discrete layers, is ejected from cavity 910.

In some other embodiments, a flow-control mechanism is present in opening 114. In such embodiments, it is not necessary to ensure that $2^{nd}$ shot remains in a solid state as $1^{st}$ shot 116 is liquefied. In such an embodiment, the flow-control mechanism, rather than differential heating, is used to facilitate downward movement of partition 112 (in conjunction with springs 1034).

It is to be understood that the disclosure describes a few embodiments and that many variations of the invention can easily be devised by those skilled in the art after reading this disclosure and that the scope of the present invention is to be determined by the following claims.

What is claimed:

1. A method for molding a multi-material part, wherein the method is performed in a molding tool, wherein the molding tool includes a mold cavity having an upper portion, a lower portion and a partition, wherein a cross-sectional area of the upper portion of the molding tool is relatively larger than a cross-sectional area of the lower portion, and wherein the partition has a cross sectional area substantially equal to the lower portion of the mold cavity, the method comprising:

segregating via the partition, a first molding material from a second molding material in the mold cavity by disposing the first molding material in the upper portion of the mold cavity in a region between a perimeter of the upper first portion and a perimeter of the partition, the partition thereby bounded by the first molding material, and disposing the second molding material in the lower portion of the mold cavity;

forming a first molded portion of the multi-material part from the first molding material;

flowing the second molding material through the partition to the first molded portion by actuating the partition to move downwardly, applying pressure to the second molding material, wherein the second molding material flows to a region formerly occupied by the partition, and is thereby bounded by the first molded portion; and forming a second molded portion of the multi-material part from the second molding material, the first molded portion and the second molded portion sharing a common interface.

2. The method of claim 1 wherein the multi-material part comprises a first layer that overlies a second layer, wherein the first molded portion defines the first layer and the second molded portion defines the second layer.

3. The method of claim 1 wherein, in the multi-material part, the first molded portion and the second molded portion are coplanar with one another.

4. The method of claim 1 comprising flowing the first molding material into the mold cavity.

5. The method of claim 1 wherein segregating via a partition, the first molding material from the second molding material comprises positioning the second molding material below the partition and positioning the first molding material above the partition.

6. The method of claim 1 wherein forming the second molded portion of the multi-material part from the second molding material creates the multi-material part wherein the first molded portion and the second molded portion are coplanar with one another.

7. The method of claim 1 wherein forming the first molded portion of the multi-material part comprises liquefying a resin in the first molding material and consolidating the first molding material via compression molding.

8. The method of claim 7 wherein forming the first molded portion comprises not liquefying a resin in the second molding material until the first molded portion is formed.

9. The method of claim 7 wherein forming the first molded portion comprises liquefying the resin in the first molding material and a resin in the second molding material at the same time.

10. The method of claim 9 wherein flowing the second molding material through the partition to the first molded portion comprises actuating the partition to move downwardly, applying pressure to the second molding material.

11. The method of claim 10 wherein flowing the second molding material through the partition to the first molded portion comprises actuating a flow control mechanism to permit flow of the second molding material through the partition.

* * * * *